P. J. ELLIOTT.
LOGGING HOOK.
APPLICATION FILED OCT. 15, 1918.
1,303,048.
Patented May 6, 1919.
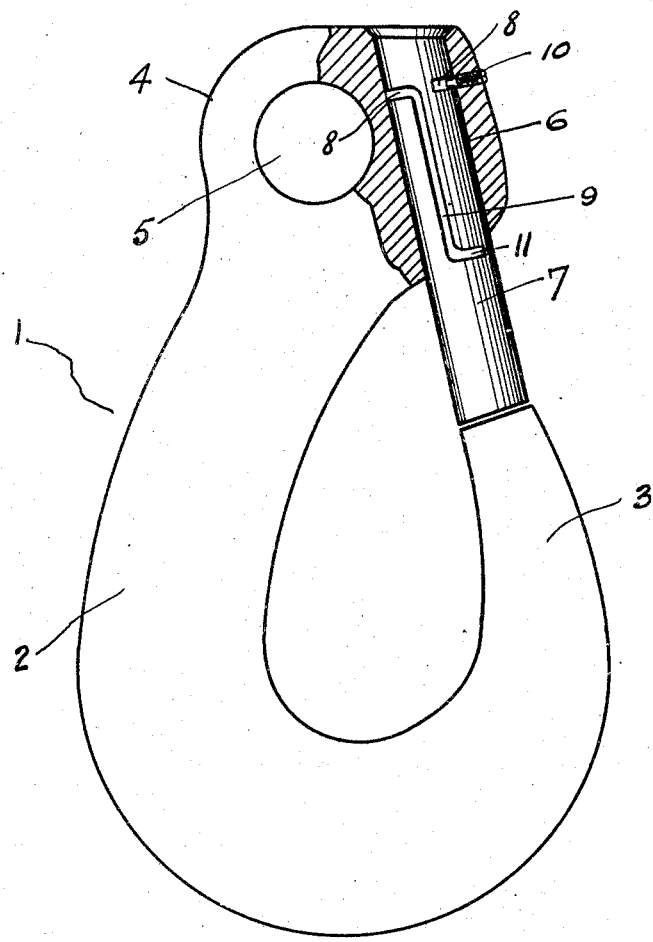
INVENTOR
Patrick Joseph Elliott.
BY
ATTYS

UNITED STATES PATENT OFFICE.

PATRICK JOSEPH ELLIOTT, OF JACKSON BAY, BRITISH COLUMBIA, CANADA, ASSIGNOR OF ONE-HALF TO EINAR STRENG, OF JACKSON BAY, BRITISH COLUMBIA, CANADA.

LOGGING-HOOK.

1,303,048.  Specification of Letters Patent.  Patented May 6, 1919.

Application filed October 15, 1918. Serial No. 258,221.

*To all whom it may concern:*

Be it known that I, PATRICK JOSEPH ELLIOTT, a subject of the King of Great Britain, and a resident of Jackson Bay, in the Province of British Columbia, Canada, have invented certain new and useful Improvements in Logging-Hooks, of which the following is a specification.

My invention relates to improvements in logging hooks, with particular reference to hooks used in logging operations, such as high lead hooks, although it may be used with equal facility in other work, and the object of my invention is to provide a simply constructed hook by the use of which the load is securely held to the hauling line at the same time connection and disconnection of the same is effected with great ease and convenience.

I attain this object by the construction illustrated in the accompanying drawing in which the figure shows the hook in part section and locked.

The hook, indicated generally by the numeral 1, is formed as shown, having the shank 2 connecting the hook bill 3 with the head 4, in which head is an eye 5 to which the line is connected and a bore 6, this bore extending through the head directly above the point of the hook bill 3. Mounted in the bore for vertical movement therein is a pin 7 adapted to extend across the hook entrance, adjacent the upper end of which pin is a groove 8 carried about two-thirds around the pin annularly and extended at one end longitudinally of the pin as shown at 9, into which groove projects the point of a locking pin 10 secured into the head by any approved means, the lower end of the groove being turned at right angles and carried around the pin for a short distance, as shown at 11.

The manner in which the hook is operated will be apparent, as it will be seen that when locked the pin 7 extends across the hook entrance to effectually prevent the disconnection of a line therefrom, since the pin is locked against vertical movement by the engagement of the locking pin 10 with the groove 8. When it is desired to disconnect the line from the hook, however, the pin 7 is simply turned around until the longitudinal portion 9 of the groove is brought in line with the pin 10, when it may be raised vertically to open the hook entrance, in which position it is locked by the engagement of the pin in the lower end 11 of the groove.

It will be seen, therefore, that I have devised a high lead hook which is simple and practical in construction and convenient to operate.

What I claim as my invention is:

In a hook, a rotatable and vertically movable pin mounted in the hook head having its lower end adapted to extend adjacent the hook bill so as to close the hook entrance, said pin having a groove extending annularly partially around it, one end of said groove being extended longitudinally of the pin, and a projection adapted to engage the annular groove in the lowest position of the pin and into line with which the longitudinal groove may be brought by the rotation of the pin.

Signed at Vancouver, B. C., this 27th day of September, 1918.

PATRICK JOSEPH ELLIOTT.

Copies of this patent may be obtained for five cents each, by addressing the "Commissioner of Patents, Washington, D. C."